Patented Apr. 27, 1943

2,317,793

UNITED STATES PATENT OFFICE 2,317,793

METHOD FOR THE PRODUCTION OF STEEL

Peer D. Nielsen, Lorain, Ohio, assignor to National Tube Company, a corporation of New Jersey No Drawing. Application January 15, 1942, Serial No. 426,929

5 Claims. (Cl. 75—56)

This invention relates to the production of steel, and more particularly to a method for accomplishing the same which is predicated upon a reduced consumption of steel scrap when using varying amounts of blown metal in stationary open hearth furnace practice.

In commercial practice it is very desirable to use the highest possible percentage of pig iron in the charge of the open hearth furnace, in order to reduce as much as possible the use of steel scrap. In ordinary basic open hearth practices with which I am acquainted there is used in the total open hearth charge, steel scrap amounting to from approximately 28 per cent to 60 per cent thereof. This steel scrap accumulates from numerous processing operations and other sources.

Under normal economic conditions, the market price of steel scrap is always materially higher than the average cost of producing pig iron, thereby making it desirable to use as much as possible of the latter.

In standard duplex practice utilizing Bessemer converters in conjunction with tilting open hearth furnaces, the charge in the process is composed largely of pig iron. Practically all of the charge to the open hearth furnace is metal blown from pig iron in Bessemer converters. The general plant layout is such that handling blown metal in the large quantities required constitutes no problem. The use of tilting open hearth furnaces for refining the blown metal from the converters provides means for handling any desired percentage of blown metal in combination with pig iron or scrap without any difficulty. The ability of a tilting furnace to cope with the violent reactions occurring in the duplex process and the facilities provided in such a furnace for the removal of slag resulting from those reactions is, of course, the reason the tilting furnaces are universally used for the duplex process of manufacturing steel.

In tilting open hearth furnaces, slag can be removed from the furnace at any time it is formed, and its removal deemed desirable, by merely tipping the furnace to bring the slag to the level of the provided openings.

The use of blown metal in stationary open hearth furnaces presents much more complex problems than it does in tilting open hearth furnaces. Stationary open hearth furnaces, with their considerably smaller hearth area, do not have sufficient hearth volume to properly handle reactions of the character commonly encountered in regular duplex practice and have usually inadequate facilities for the removal of the slag resulting from these reactions. Many existing stationary open hearth furnace plants have a large number of furnaces, and, as no consideration was given to the use of blown metal when they were built, plant layout as well as the large number of furnaces involved makes it practically impossible to use blown metal, except on an extremely limited scale.

In stationary open hearth furnaces, the elevation of the opening through which slag can be removed is usually fixed and at best it is adjustable only within narrow limits. Consequently, slag removal can be accomplished only when the slag level reaches the level of the flush hole provided, and therefore slag cannot be removed from the furnace prior to the time it is completely charged with its normal burden.

These shortcomings of a stationary open hearth furnace mitigate against its use as a component part of the regular duplex process, and to use blown metal in any proportion requires a procedure quite different from that permissible in tilting open hearth furnaces.

In some instances the use of blown metal as a portion of a stationary open hearth charge is desirable, the principal accruing advantage being an increase in furnace production. Heretofore the use of blown metal as a part of the charge of a stationary open hearth furnace has had the attending disadvantage that it reduces the amount of pig iron that can be employed in the process. For example, I have found that as compared to a straight scrap and pig iron charge, where 45 per cent pig iron is used, it is necessary when charging 20 per cent blown metal, to reduce the pig iron charge to 35 per cent for comparable results with respect to carbon content of the bath at melt. Thus one-half of the amount of blown metal used in this case replaces pig iron and the remaining half replaces scrap. In general it has been found that when charging blown metal in amounts varying from between 10 per cent and 50 per cent of the total furnace charge and operating with a straight scrap and pig iron practice, it is generally necessary to reduce the pig iron charged by one-half of the amount of blown metal charged to insure a satisfactory carbon content of the bath at melt.

It was at first believed that blown metal would not have any appreciable effect on the pig iron requirement, and that the use of blown metal would reduce the requirement for scrap a like amount. But such is not the case. Attempts were made to hold the pig iron charged to the percentage ordinarily used by adding to the charge materials bearing iron oxide so that the blown metal addition would result in the replacement of a like amount of scrap. That the addition of iron oxide to the charge is essential to accomplish this result is explained by the fact that considerably less iron oxide is formed from melting the smaller amount of cold scrap used in the blown metal practice and, due to early additions of pig iron and the faster rate of melting following the blown metal addition, the time during which oxidation of iron can take place is considerably diminished. In order to make possible charging the same amount of pig iron used in regular practice, it thus becomes necessary to make up the deficiency of iron oxide formed when using blown metal as a portion of the charge by additions of iron oxide in the form of roll scale or iron ore, if the same melt carbon is to be obtained in both cases.

Attempts were made to add either roll scale or iron oxide during charging to make up for the iron oxide deficiency and to secure melt carbons of the desired value when charging pig iron in amounts comparable to that charged in regular practice. With the high silica contamination of the iron-oxide-bearing material available for use, first efforts were not satisfactory. Due to the fact that the highly siliceous slag initially formed was not flushed out of the furnace, the subsequent formation of a satisfactorily basic finishing slag was made quite difficult. The time and material required to develop a satisfactory slag and the erosion to furnace hearth refractories during the prolonged refining period counteracted to a large degree any advantage due to the faster melting of the charge.

Experience leads to the conclusion that to use blown metal in small amounts satisfactorily in a stationary open hearth furnace, there are only two alternatives. One is for the operator, as is the usual practice, to adopt a straight scrap and pig charge without ore, charge blown metal in various proportions with the result that requirements for pig iron and scrap be each reduced approximately an equal amount, the total reduction of pig iron and scrap equaling the blown metal addition. While the reduction in pig iron consumption ordinarily is disadvantageous, it would still be profitable to use blown metal during periods when the maximum possible furnace producing rate was desirable.

In order to maintain the percentage of iron charged identical to that used in normal practice, some form of iron-oxide-bearing material must also be introduced if the carbon content of the bath at melt is maintained at a comparable value. To use such materials successfully necessitates the removal from the furnace of the highly siliceous slag formed in the initial stages of melting.

I have developed a satisfactory method of using blown metal according to the second alternative.

In accordance with the teachings of the present invention, the openings through which slag is drawn from stationary open hearth furnaces are so arranged that their elevation can be adjusted to draw slag off the metal surface within the furnace from any charge within a wide operating range. That is, the flush holes are placed at a low enough level so that slag can be drawn off from the minimum charge and arranged so that they can be built up with basic refractory material to any desired level to accommodate the maximum charge.

One mode of operation is to charge pig iron, scrap and ore in amounts to result in a metallic furnace burden less than the desired total by the amount of blown metal provided so that with the addition of blown metal the entire charge will result in the production of the desired total.

If for a total production of 168 tons of steel it is desired to use 50 tons of blown metal, the furnace is originally charged with material sufficient for the production of a 118-ton heat. This portion of the charge is composed of pig iron, scrap, and ore in approximately the same proportion as these materials are used in standard high iron practice. It is possible, however, to charge a higher percentage of pig iron in a 118-ton heat than in a 168-ton heat for a given furnace, due to the fact that with the smaller heat, hearth volume is proportionately greater and thus with the smaller heat the more severe reactions attending the higher pig charge can be successfully dealt with.

The charging procedure of the original 118-ton portion of the heat is identical to that employed in regular high metal practice. The required amount of limestone is charged on the hearth followed by approximately one-half the scrap. The ore is then spread evenly over the surface of this scrap and then the balance of the scrap is charged. At times it is desirable to sandwich the ore in two different layers: one after half the scrap is charged and one after an additional one-fourth of the scrap is charged. Charging ore in this manner has the advantage that reactions occurring upon the addition of molten pig iron are considerably less violent than would be the case if large masses of ore were buried deep in the charge.

After the above described charging procedure is completed, a sufficient time is allowed to elapse to insure thorough heating of the entire furnace contents preparatory to the addition of molten pig iron. With the charge thus properly prepared, the molten pig iron is added. The reactions attending the addition result in the immediate formation of a highly siliceous and very fluid slag having a foamy constituency. This slag is drawn from the furnace through the movable flush holes described.

Up to this point, the procedure is identical with that of conventional stationary open hearth practice when charging ore and large percentages of pig iron.

In accordance with the teachings of the present invention, when the flush slag is removed, the flush hole is closed, and care is taken because of its low level at this stage of the operation to form a bank of suitable refractory material to raise its level to a point sufficiently high so that the surface of the metallic contents of the furnace when fully charged will be at a lower level with respect thereto. With the flush hole closed in this manner, the blown metal is added. If there occur no further reactions of a character to make further slag flushing desirable, furnace procedure continues from this point in a manner identical to conventional stationary open hearth practice. If a reaction occurs which makes further slag flushing desirable, the flush hole is opened at a higher and suitable level to permit this operation to proceed to completion; at which time the flush hole is again closed and from this point the balance of the melting and refining operation is identical to conventional stationary open hearth practice.

By providing a flush hole adjustable in height, there is permitted satisfactory flush slag removal from charges very much smaller than a given furnace is normally required to tap. This enables the use of blown metal in a stationary open hearth furnace. By charging a heat short by the amount of blown metal intended to be used and using a standard high iron open hearth charge and practice on this original portion of the charge, there is made feasible the use of considerably more pig iron in the process than would otherwise be possible.

As previously mentioned, ore cannot be successfully used in appreciable amounts as a constituent of the charge when blown metal is used in a stationary open hearth furnace, if the initially formed highly siliceous slag is retained in the furnace. The removal of this slag from a furnace of conventional design is not practical, due to the fact that the opening provided for slag removal is located at a level suitable for slag removal only when the furnace is fully charged. Furthermore, if upon the addition of the molten pig iron, the blown metal is added in order to bring the slag to a level sufficiently high to permit of the removal of slag through the conventional furnace opening, the results would be unsatisfactory. The factor limiting the amount of pig iron in stationary open hearth practice is the furnace's capacity to cope with the violent reactions which occur between the iron and ore upon the addition of the pig iron to the furnace. If there is used the maximum amount of pig iron, the addition of blown metal which would augment these reactions would be impossible until the pig iron and ore reaction subsided to a safe point. As it is desirable to immediately start the removal of the highly siliceous slag formed by the pig iron and ore reaction upon the addition of the pig iron, any delay in starting slag removal is undesirable. Flushing the furnace after the addition of blown metal should also be avoided as much as possible, as sufficient impurities can be removed from the furnace by flushing the slag resulting from the pig iron and ore reaction to make subsequent refining satisfactory. Flushing the furnace after the addition of blown metal results in a more voluminous slag removal, and as this slag has a very high iron content, iron is unnecessarily lost.

With the practice of the present invention there is permitted the charging of maximum amounts of pig iron in conjunction with blown metal to thus obtain increased furnace producing rates by using blown metal in a stationary open hearth furnace and still avoid the undesirable reduction in consumption of pig iron which attends its use in conventional practices.

In the following examples, the blown metal is blown to approximately .05 to .10 per cent carbon at a temperature slightly over 3000° F., and very satisfactory results are produced:

| Blown metal | Hot metal | Iron scrap | Ore | Cold steel scrap |
|---|---|---|---|---|
| Per cent | Per cent | Per cent | Per cent | Per cent |
| 16 | 44.3 | 4.8 | 3.1 | 31.7 |
| 16 | 48.7 | 4.3 | 3.6 | 27.4 |
| 16 | 53.3 | 4.1 | 4.3 | 22.3 |
| 32 | 41.6 | 3.8 | 3.4 | 19.4 |

While I have shown and described specific embodiments of the present invention, it will be seen that I do not wish to be limited exactly thereto, since various modifications may be made without departing from the scope of the invention as defined in the appended claims.

I claim:

1. The method of using blown metal, pig iron, and ore in the manufacture of steel in a stationary open hearth furnace, comprising initially charging the furnace with pig iron and ore in an amount equal to the capacity of the furnace less the amount of blown metal it is desired to use, removing the slag resulting from the pig iron and ore reaction after the reaction has subsided, and then adding sufficient blown metal to fill the furnace.

2. The method of using blown metal, pig iron, and iron oxide in the manufacture of steel in a stationary open hearth furnace, comprising initially charging the furnace with pig iron and iron oxide in an amount equal to the capacity of the furnace less the amount of blown metal it is desired to use, removing the slag resulting from the pig iron and iron oxide reactions, and then adding sufficient blown metal to fill the furnace.

3. The method of using blown metal, pig iron, scrap and ore in the manufacture of steel in a stationary open hearth furnace, comprising initially charging the furnace with pig iron, scrap and ore in an amount equal to the capacity of the furnace less the amount of blown metal it is desired to use, removing the slag resulting from the pig iron and ore reactions and then adding sufficient blown metal to fill the furnace.

4. The method of using blown metal, pig iron, scrap and ore in the manufacture of steel in a stationary open hearth furnace, comprising initially charging the furnace with pig iron, scrap and ore in an amount equal to the capacity of the furnace less the amount of blown metal it is desired to use, the percentage of the pig iron, scrap and ore being in approximately the same proportion as these materials are used in standard high iron practices, removing the slag resulting from the pig iron and ore reactions and then adding sufficient blown metal to fill the furnace.

5. The method of using blown metal, pig iron, scrap and ore in the manufacture of steel in a stationary open hearth furnace, comprising initially charging the furnace with pig iron, scrap and ore in an amount equal to the capacity of the furnace less the amount of blown metal it is desired to use, the percentage of pig iron being higher than the percentage commonly used in standard high iron practices, removing the slag resulting from the pig iron and ore reactions and then adding sufficient blown metal to fill the furnace.

PEER D. NIELSEN.